US006819012B1

(12) United States Patent
Gabrys (10) Patent No.: US 6,819,012 B1
(45) Date of Patent: Nov. 16, 2004

(54) FLYWHEEL ENERGY STORAGE SYSTEM

(76) Inventor: Christopher W. Gabrys, 125 SW. Campus Dr. Apt. 8-201, Federal Way, WA (US) 98023

( * ) Notice: Subject to any disclaimer, the term of this patent is extended or adjusted under 35 U.S.C. 154(b) by 294 days.

(21) Appl. No.: 09/887,899

(22) Filed: Jun. 21, 2001

Related U.S. Application Data (60) Provisional application No. 60/214,017, filed on Jun. 23, 2000.

(51) Int. Cl.[7] .................................................. H02J 3/33
(52) U.S. Cl. ........................................................ 307/68
(58) Field of Search .............................. 307/68, 46, 48, 307/64, 66, 85–87; 363/95, 97, 141, 34, 37, 40

(56) References Cited

U.S. PATENT DOCUMENTS

| | | |
|---|---|---|
| 4,707,744 A | 11/1987 | Kimata |
| 5,574,345 A | 11/1996 | Yoneta et al. |
| 5,705,902 A | 1/1998 | Merritt et al. |
| 5,801,937 A * | 9/1998 | Gold et al. ................. 363/141 |
| 5,969,457 A | 10/1999 | Clifton et al. |
| 6,184,593 B1 * | 2/2001 | Jungreis ....................... 307/64 |
| 6,486,627 B1 * | 11/2002 | Gabrys ........................ 318/161 |

FOREIGN PATENT DOCUMENTS

WO  WO 98/43341  10/1998

* cited by examiner

Primary Examiner—Gregory J. Toatley, Jr.
(74) Attorney, Agent, or Firm—J. Michael Neary (57) ABSTRACT

A flywheel uninterruptible power supply has an energy storage flywheel supported in a low pressure containment vessel for rotation on a bearing system. A brushless motor/generator is coupled to the flywheel for accelerating and decelerating the flywheel for storing and retrieving energy. The flywheel is rotated in normal operation at a speed such that the generator voltage is higher than the output voltage. Power supplied to the load from the generator is a regulated output that is maintained at a substantially constant voltage level by using switching regulation of the alternating current voltage generated by the generator. The switching regulation of each generator phase occurs at a frequency equal to or less than twice the frequency of the generator alternating current. As so operated, the flywheel uninterruptible power supply efficiently maintains power to an electrical load during an interruption of primary power by supplying power generated from the flywheel generator.

28 Claims, 12 Drawing Sheets

FLYWHEEL ENERGY STORAGE SYSTEM

This is related to U.S. Provisional Application No. 60/214,017 filed on Jun. 23, 2000 and entitled "Power System for Flywheel Based Uninterruptible Power Supply".

This invention pertains to a flywheel energy storage system and more particularly to an energy extraction method and circuit that provides increased energy delivery capacity for a flywheel system by having a higher output efficiency and simultaneously has a longer life and higher reliability.

BACKGROUND OF THE INVENTION

Flywheel uninterruptible power supplies have emerged as an alternative to electrochemical batteries for prevention of power interruptions to critical loads. Electrochemical batteries used in these applications, in particular, valve regulated lead acid batteries, have many undesirable traits. The life of batteries is short, typically between 1 to 7 years depending on the environment and use. They require periodic maintenance and inspection are subject to thermal degradation and can fail unpredictably when required. Lead acid batteries and other types as well are also not environmentally friendly. However, lead acid batteries are relatively inexpensive. Flywheel systems show promise to eliminate the disadvantages of batteries with the expectation of achieving 20 year lives with minimal or no maintenance, temperature insensitivity, previously unachievable reliability while being environmentally benign.

Figure 1:
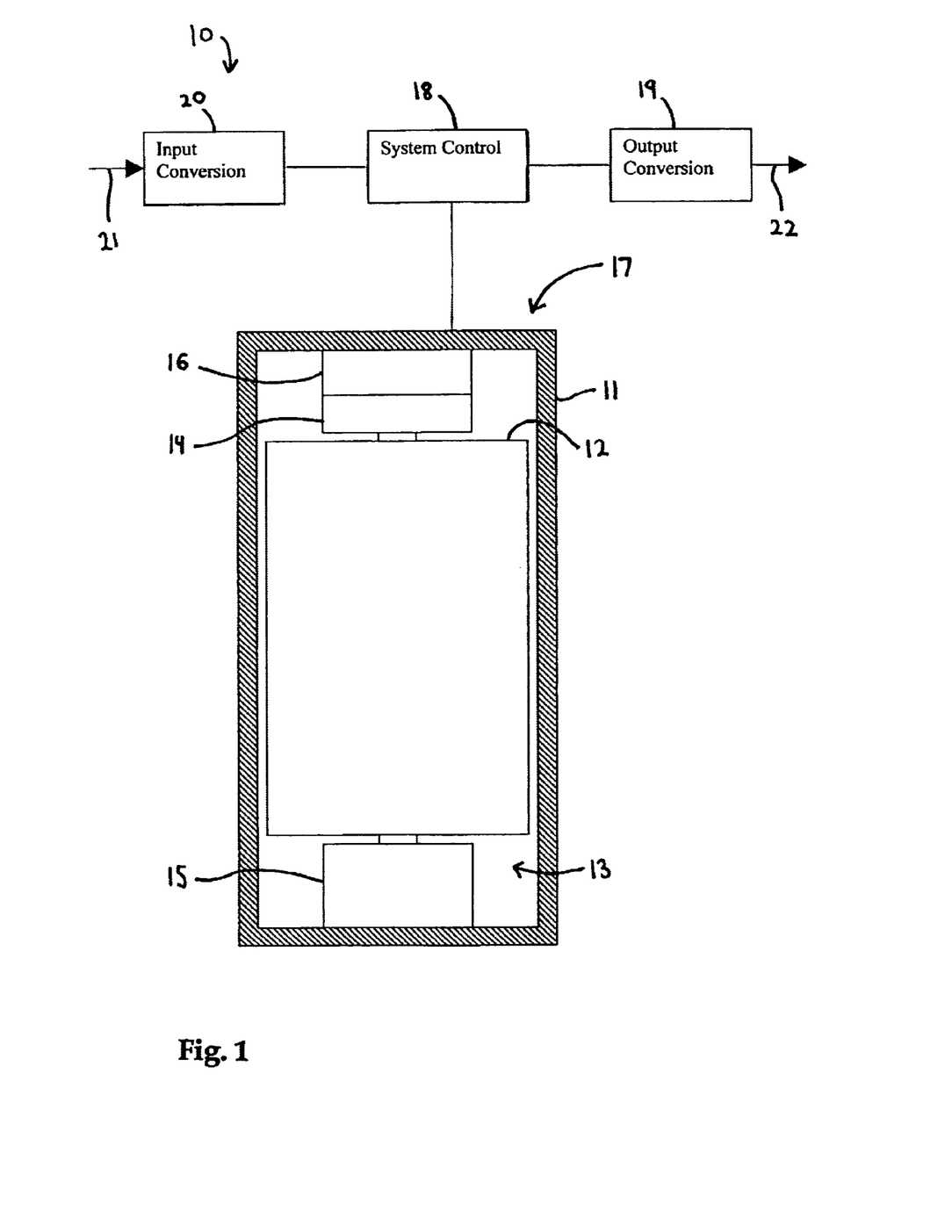
FIG. 1 is a schematic drawing of a flywheel energy storage system.

A flywheel energy storage system is shown in FIG. 1. A high-speed flywheel 12 stores electrical energy in the rotating inertia of a flywheel. Flywheels can be either constructed of metal or of composite materials. The flywheel is supported for rotation using upper and lower bearings 14 and 15. The flywheel can be supported on mechanical bearings, magnetic bearings or a combination. An attached motor/generator 16 is used to accelerate and decelerate the flywheel 12 for storing or retrieving energy. Many designs of motor/generators exist and can be employed. Motor/generators can also be made as separate components. To reduce the losses from aerodynamic drag, the interior 13 of the housing 11 surrounding the flywheel 12 is maintained at a low pressure, or for slower flywheels it can be filled with a gas of small molecule size such as helium. The flywheel mechanical unit 17 is electrically connected for operation and conversion of power. Typically, utility power 21 is taken is taken in for input conversion 20 and power is supplied to a critical load 22 through output conversion 19. A system control 18 provides control for the system 10.

Regardless of the physical design employed, it is desirable for the flywheel system to both maximize its stored energy capacity and also to maximize its operating life. Such capability can offset the higher initial cost of the flywheel system over batteries by actually becoming cheaper when considered over the system life. One element of flywheel uninterruptible power supplies that deserves particular attention is the power system electronics. Designing electronics for an operating life that is preferably greater than 10–20 years without failures is challenging. Likewise, increasing the efficiency of the power system is preferable for allowing more of the stored energy of the flywheel to be delivered to the load.

Figure 2:
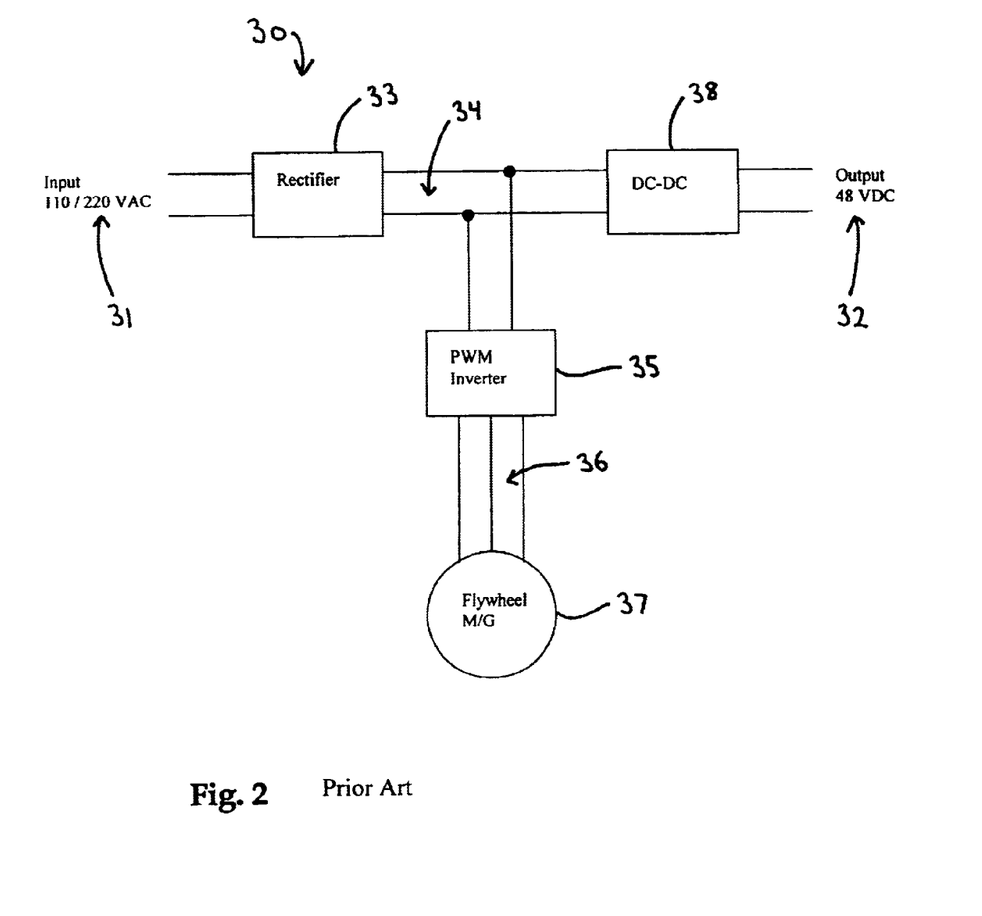
FIG. 2 is a schematic drawing of a power system for a flywheel uninterruptible power supply using an output DC-DC converter of the prior art.

One power system configuration that has been used with previous flywheel uninterruptible power supplies is shown at 30 in FIG. 2. The power system 30 takes in utility power 31 and supplies protected direct current power at the output 32. For many telecommunications systems such as telephone and wireless, the output voltage 32 required is −48 volts or 24 volts. For other applications, such as high power ride-through for data centers or critical manufacturing, the input and output voltages would be increased. The input power 31 is rectified to a DC bus 34 using a rectifier 33 which can be either controlled or uncontrolled. The DC bus 34 supplies power to a PWM (pulse width modulated) inverter 35 also known as a servo amplifier. The servo amplifier 35 converts the DC current in the bus 34 to synchronous alternating current 36 that provides power to accelerate the flywheel 37 to normal operating speed. When the utility power is operating normally, the DC voltage in the bus 34 is converted to the output voltage 32 using a DC-DC converter 38. During an interruption in the utility power 31, energy from the rotating flywheel supplies power to the output 32 by providing power to the DC bus. The inverter provides power to the DC bus instantly and automatically when the utility power is discontinued by antiparallel diodes included with the H-bridge, not shown, inside the inverter. Power automatically flows back and is rectified to the DC bus 34 whenever the generator voltage is greater than the DC bus. As the flywheel speed slows, the voltage to the DC bus 34 drops. The output DC-DC converter 38 maintains the constant output voltage 32 during discharging of the flywheel. The output power can alternatively be alternating current power simply by replacing the output DC-DC converter 38 with an output DC-AC converter or inverter.

Current designs of DC-DC converters typically have efficiencies of between 75–90%. The less than perfect efficiency means that all of the energy stored in the flywheel cannot be effectively used. Such levels of efficiency are acceptable for many applications, however the attention given by customers and potential customers to the cost of energy storage capacity of energy flywheel uninterruptible power supplies, achieving higher efficiency is desirable. The mean time between failure for many converters is only about 12 years, which means a significant portion of flywheel systems will fail before the end of desired operating life.

Figure 3:
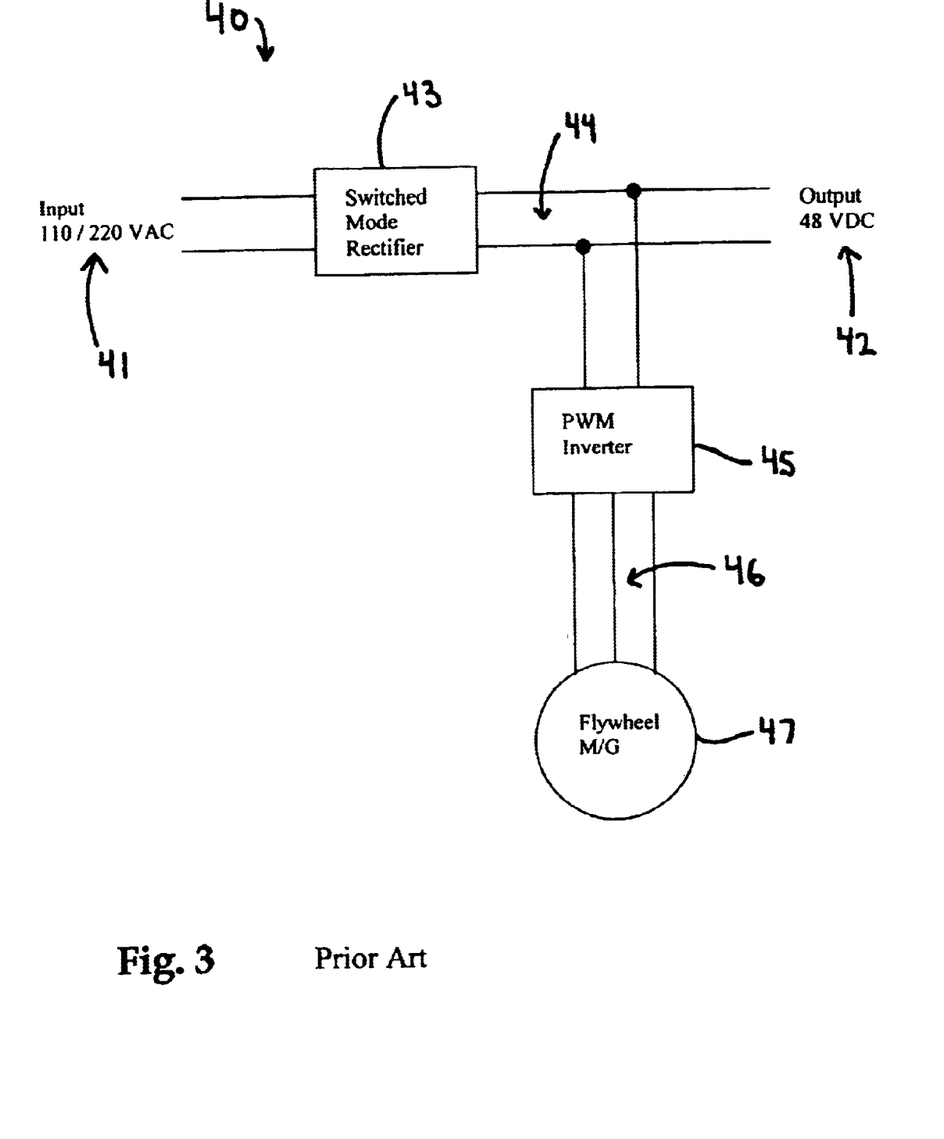
FIG. 3 is a schematic drawing of a prior art power system for a flywheel uninterruptible power supply using fourth quadrant power conversion of the motor drive inverter to provide output power.

A second configuration of power system for a flywheel uninterruptible power supply, shown at 40 in FIG. 3, is similar to that shown in FIG. 2, supplying protected DC output power 42 from utility power 41. The input power is rectified to a lower voltage DC bus 44 using a switched mode rectifier 43. The output power 42 is supplied directly from the DC bus 44. The DC bus is also connected to a PWM inverter 45 that generates synchronous AC to power lines 46 to accelerate the flywheel motor/generator 47 to fully charged operating speed. During an interruption of primary power 41, the servo amplifier 45 supplies power to the DC bus 44 and output 42. The output is maintained at a constant voltage during the slowing of the flywheel by using fourth quadrant regenerative operation of the servo amplifier 45. Fourth quadrant operation uses switching with the internal inductance and capacitance to actively decelerate the flywheel. By actively decelerating the flywheel, the DC bus voltage is boosted to a higher voltage than the generator voltage. The output voltage is thereby maintained constant without the use of an output converter. Unfortunately, as the flywheel slows, the generator voltage drops and the generator current can become excessive if discharged to low speeds as desired for extraction of most of the energy stored in the flywheel. The servo amplifier 45 also operates similarly, having comparable efficiency as a DC-DC converter.

Another method used in previous flywheel systems to maintain a constant output voltage as the flywheel speed is decreased is to use a motor/generator with an external field coil. The field coil is used to create all or some of the magnetic flux of the generator. As the speed decreases, the power to the field coil is increased such that more flux is created, increasing the generator voltage. Some designs use both permanent magnets on the rotor in conjunction with the flux from the field coil. In either case, the requirement of power to generate all of the generator flux or to generate a significant portion of it as would be required for extraction of most of the energy in the flywheel is less efficient than a permanent magnet motor/generator that has a high magnetic flux without the use of any power. Field control designs also have increased areas for hysteresis and eddy current losses due to moving steel portions. Likewise, field control motor/generators can necessitate smaller operating magnetic air gaps to generate high fields, thereby making the use of magnetic bearings to support the flywheel more difficult.

SUMMARY OF THE INVENTION

The invention is a flywheel uninterruptible power supply having a power system and output regulation method that provides increased energy delivery capacity for the flywheel system by achieving a higher efficiency in converting the energy stored in the flywheel to power delivered to the load. The power system works by directly converting the variable frequency and voltage alternating current produced from the generator into the supplied output power. The conversion uses switching to regulate the generator power and the switching occurs by natural commutation such that the frequency is linked to the speed of the flywheel generator. As the generator produces alternating current voltage, the output regulator switches the generator power to the load during the half cycles. The regulator can provide portions of each half cycle to the load as in phase angle switching or in another embodiment, zero cross switching is used so that complete half cycles are provided. The power pulses from the generator can be combined from multiple phases and the voltage is then filtered to provide a constant output voltage. By switching at the low generator frequencies, typically between 300 Hz to 1 kHz from many flywheel systems, the efficiency of the power conversion is increased. Switching losses in power conversion are linearly proportional to the switching frequency and thus a significant improvement can be made over conventional conversion at frequencies of up to 20 kHz and higher. The drawback of the lower frequency switching is increased size of the inductor and capacitor filter components, however this is less important than the increased energy delivery for the applications of flywheel systems. The larger filter components can also be included inside the already large and heavy flywheel unit. Moreover in telecommunications applications, the downstream equipment usually have embedded converters so power regulation is not as critical.

Despite the efficiency increase solely from lower frequency, the efficiency of output power regulator is also increased through the switching process. Switching losses arise from the power dissipation in transition from on to off state or off to on state of the switching devices. Accordingly with the invention, the transition from on to off state occurs when the current through the switch is effectively zero, thereby effectively eliminating this loss. This is possible because the generator voltage is an alternating current which periodically passes through zero voltage. By switching off at zero current, energy in load or filter inductance is also not dissipated. The efficiency can be even further increased by also reducing the switching loss from transition from off to on by using zero cross switching where the on switching occurs at zero voltage. The regulation in this case occurs by allowing complete half cycles of the generator voltage to be switched to the load however only some half cycles are switched to the load so as to provide output voltage regulation. In one embodiment, the output voltage can also be an alternating current and the switching regulation converts the variable frequency generator voltage in to a fixed lower frequency output voltage. This is done directly without incurring losses from having an intermediate conversion to direct current power. In order for the output regulation of the invention to function and provide a constant output voltage as the flywheel speed slows, the flywheel must be accelerated to a normal operating speed in which the generator voltage is higher than the desired output voltage. It is preferable that the maximum generator voltage at full speed is more than twice and more preferably more than three times the output voltage for extraction of most of the flywheels energy. The higher generator voltage also further reduces losses by reducing resistive heating loss.

Another important benefit of the invention is the increased life and reliability of the power system. Because of the direct regulation of the output voltage from the generator, fewer components are required, increasing reliability. The lower switching frequency and the lower electronics stresses from the zero current on to off transitions help the output regulator achieve significantly higher reliability and longer life. The life can be further increased by the power system only supplying power from the flywheel regulator during infrequent utility interruptions and normal output power is supplied directly from separately converted utility power. The invention is applicable for use in both long term low power discharge flywheel systems as well as high power ride-through systems.

DESCRIPTION OF THE PREFERRED EMBODIMENT

Figure 4:
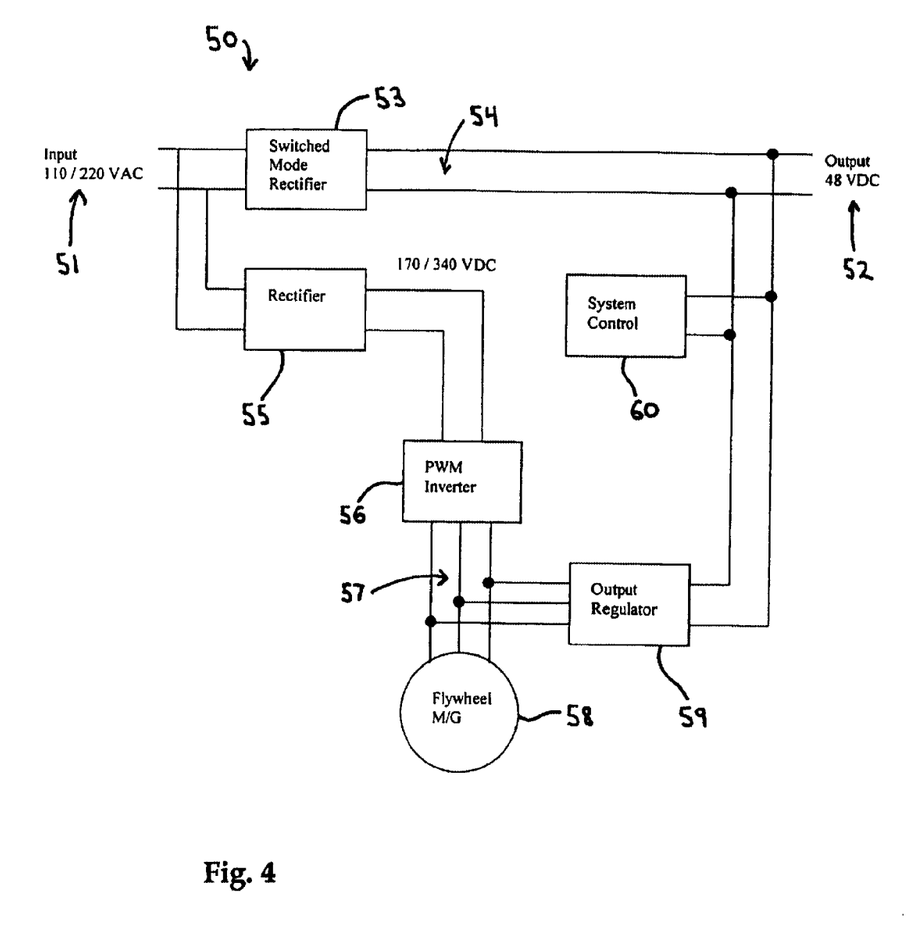
FIG. 4 is a schematic drawing of a power system for a flywheel uninterruptible power supply using switching regulation of the generator voltage in accordance with this invention.

Turning to the drawings, wherein like characters designate identical or corresponding parts, FIG. 1 shows a flywheel energy storage and retrieval system and FIG. 4 shows a power system 50 for using the a flywheel energy storage and retrieval system in FIG. 1 as a flywheel uninterruptible power supply using switching regulation of the generator voltage in accordance with this invention. The power system 50 inputs power from a primary source 51 such as utility power and converts it to protected output power 52 which is supplied to a critical load, not shown. In the configuration shown, the power system 50 is configured for a typical telephone application where the output voltage 52 is nominally −48 volts DC. When the utility power is operative, a switched mode rectifier typically supplies regulated DC voltage to the DC bus 54 and the output 52. During an interruption of primary power 51, power is supplied to the output 52 using energy stored in the rotating flywheel and converted to electrical energy in a motor/generator 58 coupled to the flywheel.

The flywheel and motor/generator 58 are accelerated using a rectifier 55 that is connected to the utility power 51. Although many types of flywheels exist and could be used with the invention, flywheels constructed of steel show a high level of promise for storing energy at low cost. Steel flywheels offer more well established manufacturing and processes and they outgass much less inside the vacuum container of flywheel uninterruptible power supplies. A brushless permanent magnet motor/generator 58 is preferably used for the highest efficiency. The rectifier 55 can be controlled or uncontrolled depending whether it is used to control the flywheel acceleration or not. The output of the rectifier 55 is connected to a PWM (pulse width modulated) inverter 56 that supplies synchronous alternating current 57 to power the motor 58. The PWM inverter is also known as a servo amplifier as a small control signal can be used to control the output power. If the inverter 56 has internal pulse modulation for limiting the motor current then a simple uncontrolled rectifier 55 can be used. Alternatively, the acceleration could be controlled using a controlled rectifier 55 and then the inverter need not have pulse modulation to control the motor power. For reducing the number of electrical connections in the flywheel system, the inverter is preferably sensorless in that synchronization with the motor is achieved without the use of added position sensors. A separate motor and generator could also be used and if so, the motor used could be an induction type although this is less preferable due to lower efficiency.

The power system achieves a high level of output efficiency by directly regulating and converting the generator voltage or motor/generator back emf, to provide output power 52 during loss of utility power. An output regulator 59 connected to directly to the generator 58 switches pieces of the alternating currents from the generator that are combined and smoothed to produce a substantially constant output voltage. The regulator 59 can use a single phase from the motor/generator or more preferably combines the multiple phases for example from a conventional three phase motor/generator for a smoother output power with less required filtering. In recent years, power converters have been built with the goal of increasing the switching frequencies for the benefits of lower size and weight and potentially cost of the filtering components. Many current designs operate at around 20 kHz, which also corresponds to the frequency with minimized effective series resistance of polypropylene capacitors used in many converters.

For a flywheel system, the goals in designing the power system need to be examined. For flywheel uninterruptible power supplies, the mechanical system including the flywheel, bearing system, motor/generator, etc, typically represent the largest costs. Therefore from a cost standpoint, maximizing the energy delivery capability of the mechanical system is crucial. To do this, the efficiency in converting the stored energy of the rotating flywheel to usable output power is the most important aspect of the power system along with its longevity and reliability. The efficiency of the invention is improved over previous power systems by accelerating the flywheel to a higher generator voltage than the output voltage and converting the generator power directly to the output power. Voltage regulation occurs using natural commutation at the generator's variable frequency, which is typically more than 20 times lower than many DC-DC converters. The off switching is also preferably done at effectively zero current points. The switching losses are linearly proportional to the switching frequency and are the result of the turn on and turn off transitions. The turn off transition can also dissipate energy stored in load and filter inductances, however switching at zero current eliminates these losses. The converter thereby achieves significantly higher efficiency. In one embodiment, the on switching losses are also reduced by using zero voltage crossover firing which is later described in further detail.

The second benefit of the power system invention is that the lower frequency and the lower switching stresses along with reduced part count increase the reliability and longevity of the power system. If the output regulator 59 only supplies significant current to the load 52 during interruption of utility power 51, as shown, the life of the regulator is further increased. It is desirable that the power system can function for up to 20 years without failure. The control of the flywheel uninterruptible power supply 50 can be provided by a control system 60 that is attached to the output of the regulator 59 and the DC bus 54. The control system 60 can include magnetic bearing controls as well as flywheel speed and power switching control. For most stationary flywheel applications, passive radial magnetic bearings are preferable because they reliably maintain radial position using permanent magnets and allow the flywheel to spin about its mass center. In such bearing systems an active axial magnetic bearing can be employed to provide stability. The control system 60 can include the electronics for magnetic bearing control and the flywheel therefore remains levitated during a loss of the utility power.

Despite the high efficiency of the power system, to increase the energy delivery capability of the flywheel to the load, the flywheel must also be able to provide power to the load over a sufficiently wide speed range. Many conventional DC-DC converters have limited input operating voltage ranges of approximately 2 to 1. A 2 to 1 speed range allows extraction of only 75% of the flywheel's energy, as the energy stored is proportional to the square of the speed. The output conversion of the invention preferably works with a flywheel speed range of at least 3 to 1 thereby extracting nearly 90% or more of the flywheel's energy. A special very wide input range DC-DC converter could be used with the power system of FIG. 2, however energy delivery capacity would be again reduced by the converter efficiency. Accordingly with the invention, the power system and output regulator operate over a wide speed range. The flywheel and motor/generator 58 are accelerated to a voltage greater than twice and more preferably greater than three times the required output voltage 52. As the flywheel speed decreases, more of the generator voltage is switched to the output by the regulator to keep the output voltage substantially constant. In some telecommunications applications in particular, the voltage could also be allowed to fluctuate a certain amount due to wide operating voltage range of downstream equipment.

Figure 5:
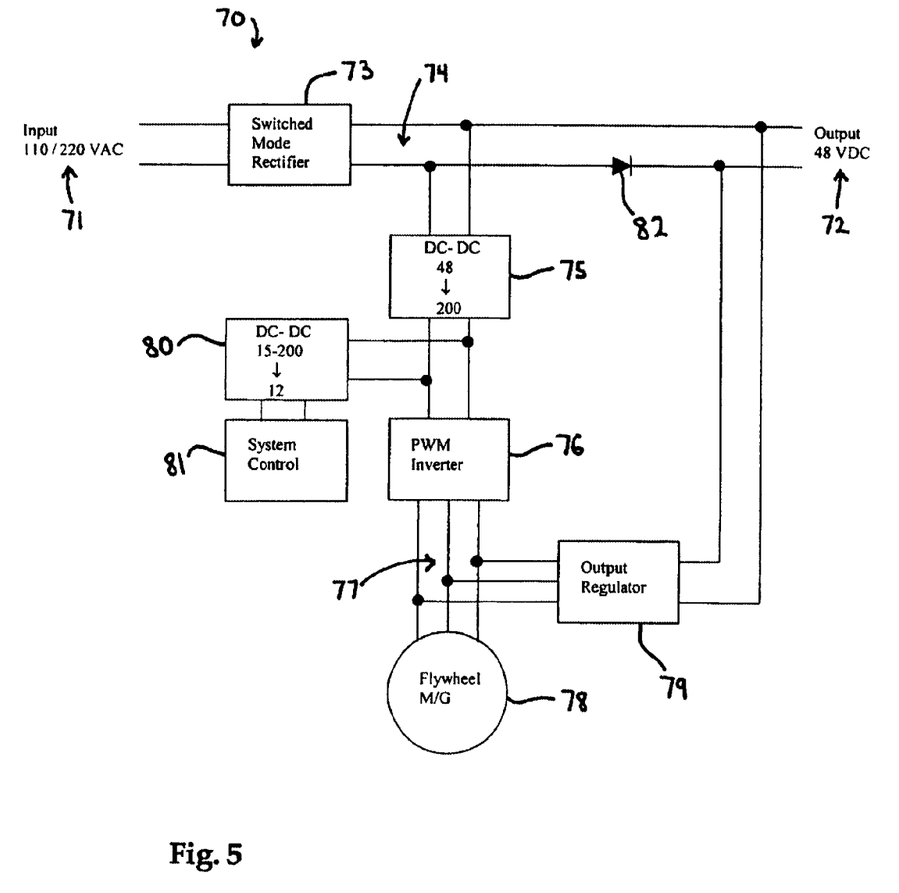
FIG. 5 is a schematic drawing of an alternate configuration power system for a flywheel uninterruptible power supply in accordance with this invention.

An alternate configuration power system for a flywheel uninterruptible power supply in accordance with this invention is shown in FIG. 5. The power system 70 is again shown with an alternating current primary power 71 and a direct current load 72. A switched mode rectifier 73 provides power to the DC bus 74 that supplies the load 72 under normal operating utility power. In this configuration, the flywheel 78 is accelerated using power from the DC bus 74.

For ride-through or other high power applications, the switched mode rectifier would not be required and hence the flywheel could be accelerated directly from the DC bus 74 which could be at a higher voltage, for example, 400 volts. For telecommunications applications, charging the flywheel uninterruptible power supply from the output of the switched mode inverter 73 can be done if the flywheel need not be rapidly accelerated or if the flywheel and power system losses are sufficiently small. A DC-DC converter 75 is connected to the DC bus 74 to increase the voltage that is supplied to the PWM inverter 76 that drives the flywheel motor/generator 78. The voltage 77 to the generator must be increased substantially above the output voltage 72 so that regulation can occur to supply power over a wide operating range.

An alternative method to increase the generator voltage 77 instead of using the DC-DC converter 75 is to include a transformer inside the PWM inverter 76. The flywheel generator 78 supplies power to the output 72 using the output regulator 79 that switches portions of the alternating generator voltage to the load 72. The portions are filtered after switching inside the regulator 79 to provide a substantially smooth voltage to the load 72. During a discharge of the flywheel from loss of utility power 71, flywheel discharge power is prevented from circulating back through the DC-DC converter 75, which would reduce efficiency, by the use of a diode 82. A switch could also be used.

The configuration 70 also shows another embodiment of the invention. The control system 81 for the flywheel uninterruptible power supply continues to receive power during a utility interruption by the back flow through the antiparallel diodes, not shown, inside the inverter. This voltage decreases with the speed of the flywheel during a discharge. A DC-DC converter 80 is used to maintain constant voltage for the system control 81 by being connected to the direct current side of the inverter 76 that drives the flywheel motor/generator 78. The DC-DC converter 80 is preferably capable of a very wide input voltage range of greater than 4 to 1. The wide range allows the magnetic bearings, if used, to maintain levitation until the flywheel speed is sufficiently low.

Figure 6:
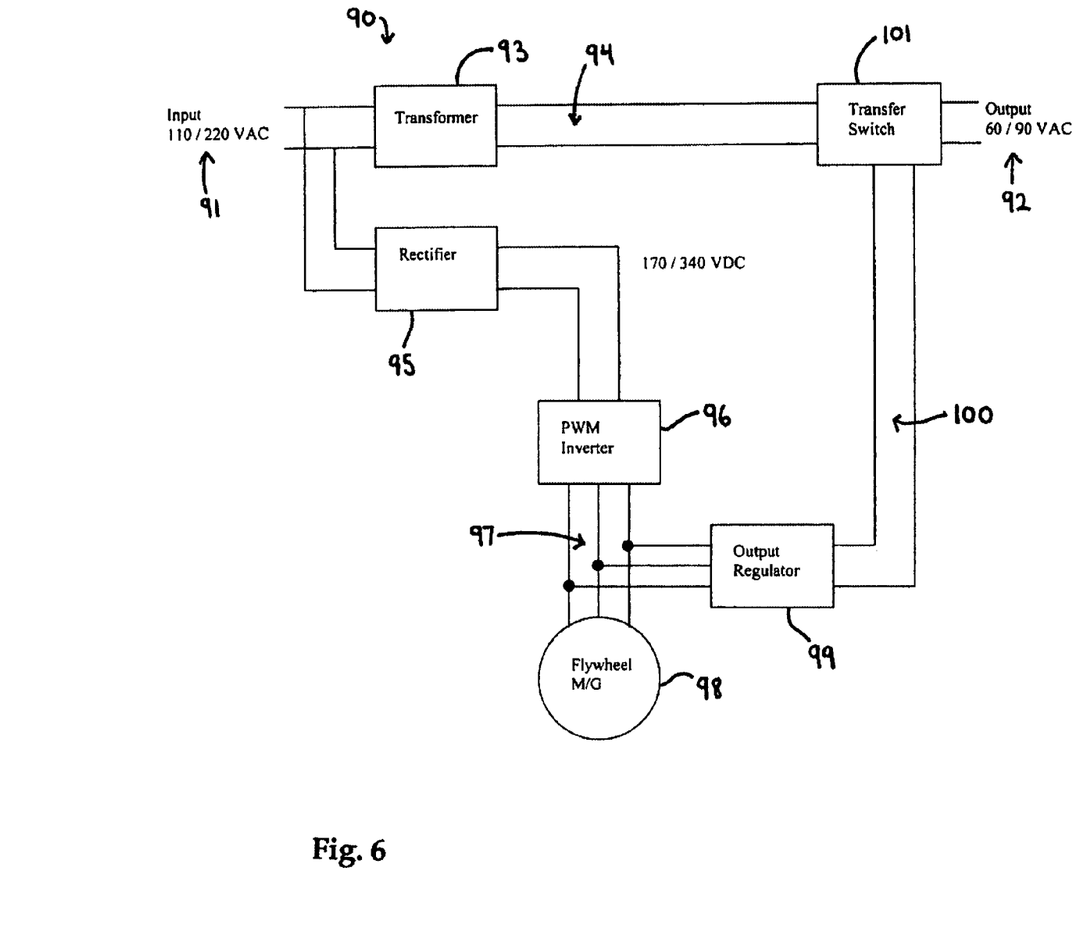
FIG. 6 is a schematic drawing of a second alternate configuration power system for a flywheel uninterruptible power supply in accordance with this invention.

A second alternate configuration power system 90 for a flywheel uninterruptible power supply in accordance with this invention is shown in FIG. 6 for providing an alternating current output. The power system 90 converts utility power 91 to a protected alternating current load power. In this case, the load is a cable TV system that requires either 60 or 90 volts AC. During normal utility power service, the input voltage 91 is converted to lower voltage power 94 through use of a transformer 93. A transfer switch 101 connects the lower voltage bus 94 to the output 92 when the utility power is operating. The flywheel uninterruptible power supply extends the life of the switching electronics by not switching the load power except during an interruption. This requires the added cost, size and weight of a low frequency transformer however it is advantageous because of the high cost of the energy storage components and the long expected operating life.

The flywheel motor/generator 98 is accelerated to normal operating speed using AC power 91. The AC power is rectified using a rectifier 95 and a PWM inverter 96 converts the power to synchronous alternating current 97 that powers the motor 98. During a loss of primary power 91, the output regulator 99 converts the variable frequency generator power 97 to the required output alternating current power 92. The transfer switch 101 switches the load to the power 100 supplied from the output regulator 99. The output regulator supplied power 100 is preferably synchronized with the utility supplied power 94 whenever the transfer switch switches. The voltage level of the generator also drops with speed when a conventional permanent magnet motor/generator is employed and thus the generator voltage when fully accelerated should be preferably more than two or three times the output voltage 92. If generator is designed with an external field coil to increase the rotor flux and maintain constant output voltage as the speed decreased, the flywheel operating speed also needs to be sufficiently high so that a fairly clean and low distortion output power can be supplied. The generator frequency per phase must be greater than the output power frequency and more preferably greater than three times the output power frequency over the entire discharge range. The output power shown is a single phase alternating current, however three phase power could also be supplied. Converting higher phase multiphase power into output power reduces the frequency requirements of the generator to provide a clean AC output voltage. For a flywheel with a normal operating speed of 30 krpm and a four pole motor/generator, the generator voltage frequency at normal speed is 1 kHz. Thus the output regulator can readily supply clean 60 Hz output it power over a wide discharge range.

Figure 7:
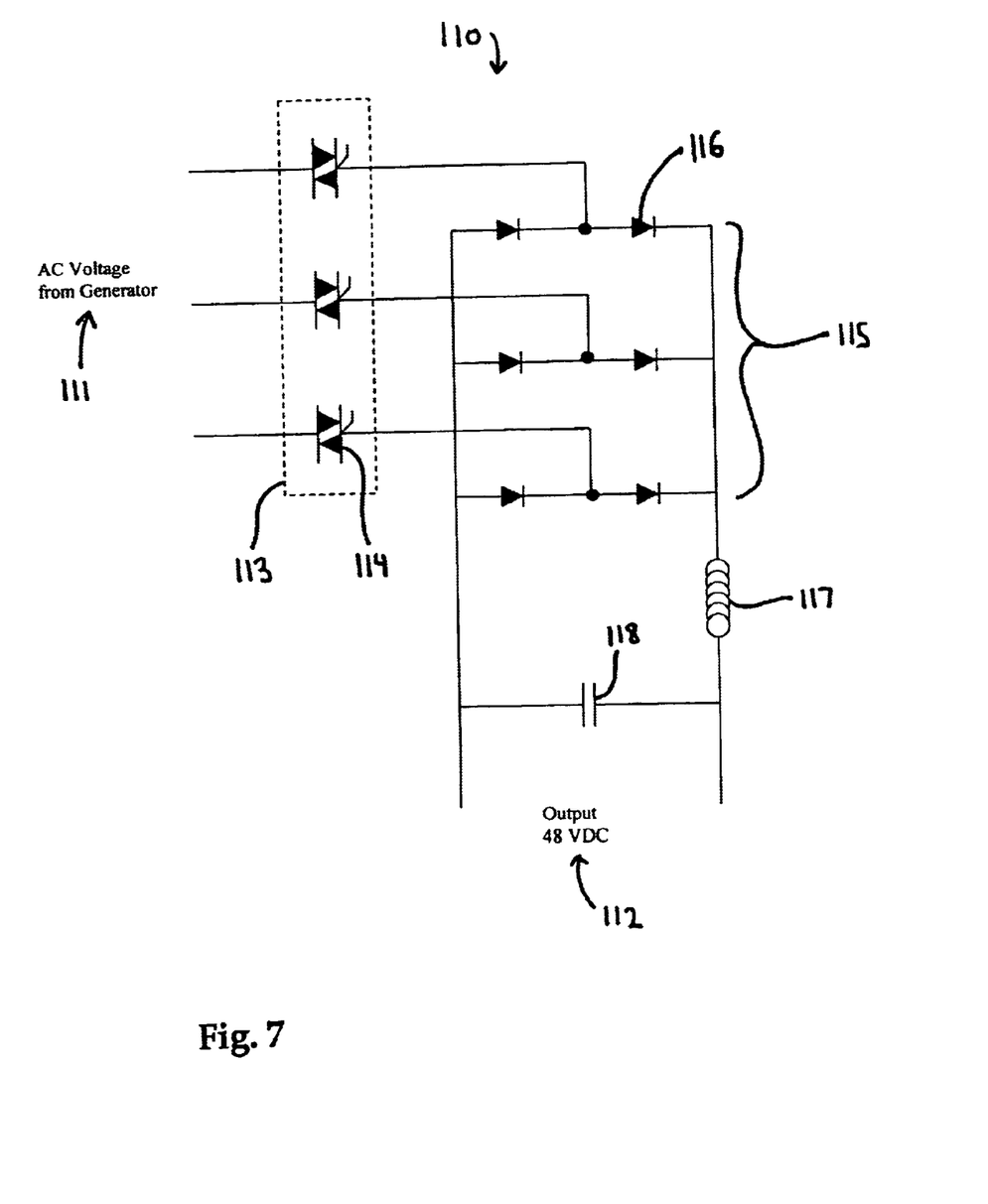
FIG. 7 is a schematic drawing of an output regulator using triac switches in accordance with the invention.

The output regulator that switches the voltage from the generator to the output voltage can be constructed with several different configurations. One configuration of an output regulator using triac switches in accordance with the invention is shown in FIG. 7. The output regulator 110 converts AC generator voltage 111 to the lower DC output voltage 112. In this configuration, a solid state relay 113 is used to regulate the power from the generator 111 and a diode bridge rectifier 115 rectifies the alternating current pulses into direct current pulses. The solid state relay 113 uses triac switches 114 with one switch for each of the three phases. Triacs are essentially antiparallel pairs of thyristors, which can conduct current in both directions and conduction is triggered by application of a small gate current pulse. Thyristors are desirable elements for this application because they are very efficient, low resistance devices when they are conducting. The triac stops conducting when the current through device drops to zero. Zero current would typically occur when the input voltage drops to zero, however when the load and or filter have significant inductances, the input voltage can become negative before the current goes to zero. The power pulses from the rectifier 115 are smoothed to a more constant DC output voltage 112 by using an inductor 117 and a capacitor 118. Other filters designs also exist, are well known in the art and could be employed. Inductors could also be added in series with generator voltage 111 to reduce the harmonic distortion in the generator and potentially increase efficiency depending on the firing scheme used by the output regulator.

Figure 8:
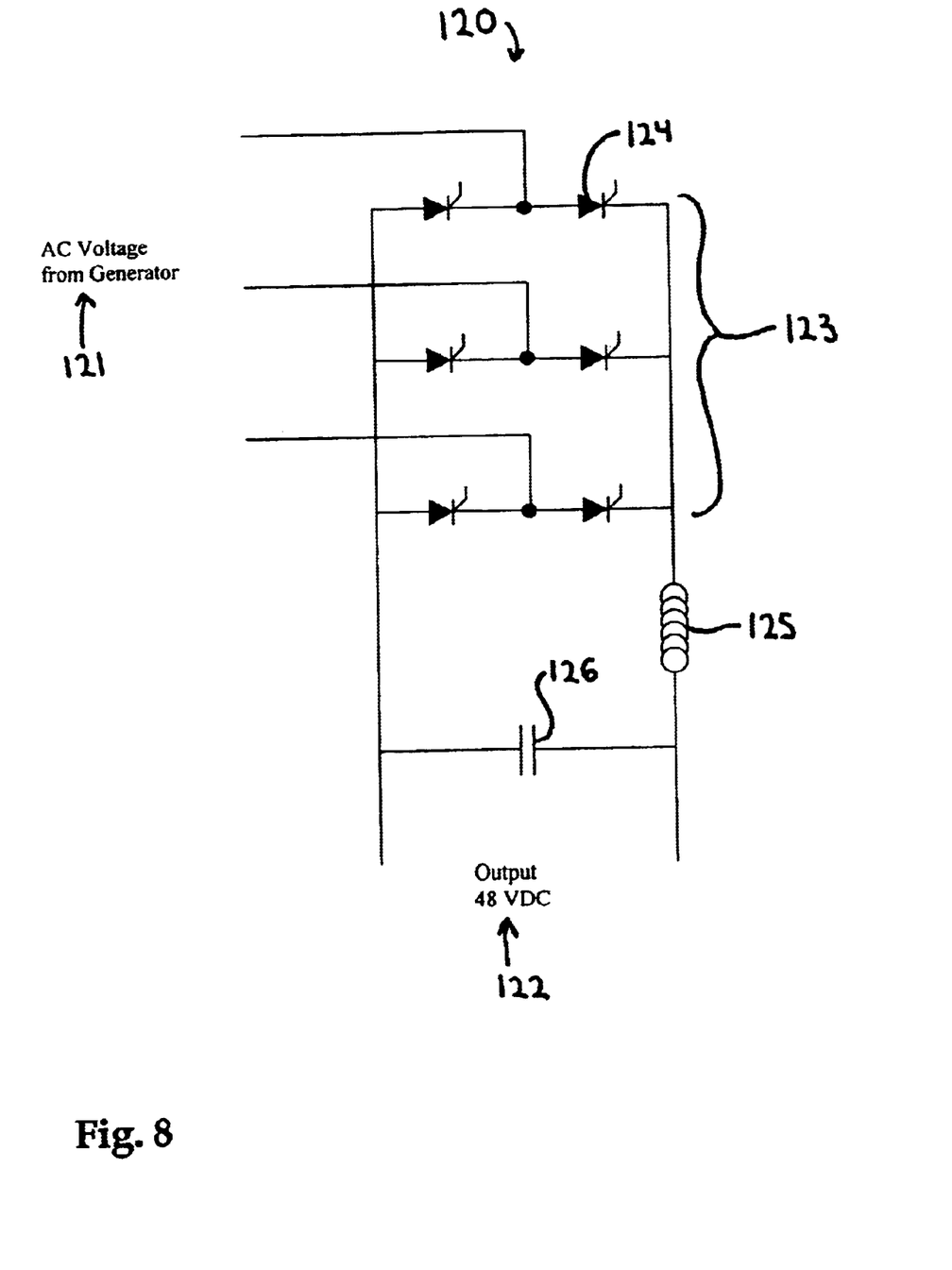
FIG. 8 is a schematic drawing of an output regulator using thyristor switches in accordance with the invention.

The output regulator can also be designed to function identically but the solid state relay can be combined into the diode bridge rectifier. An alternate configuration of an output regulator using thyristor switches in accordance with the invention is shown in FIG. 8. The voltage from the generator 121 is switched and rectified in one step using a 6 pulse controlled rectifier 123. The rectifier uses 6 thyristors 124 for regulating 3 phase power. If the motor/generator had more phases, sequentially more thyristors could be used. Gate pulses to the thyristors when required are used to regulate the output voltage 122 to the required level. The gate pulses can use a complex controlled firing scheme or alternatively a simple feedback loop with the output voltage can signal turn on of all or individual thyristors. The firing of the thyristors can be electrically isolated from the higher power currents by using small pulse transformers, not shown, and integrated circuits are readily available that can provide inverse cosine weighted phase angle so that the feed back loop can be linearized. An inductor 125 and capacitor are used to smooth the output voltage. Thyristors are preferably used for the switching because they are low cost and are available up to very high current and voltage levels. They also have the advantage of automatically switching off at the zero current point, naturally commutated. Other types of switches could also conceivably be employed but with more cost and complexity.

Figure 9:
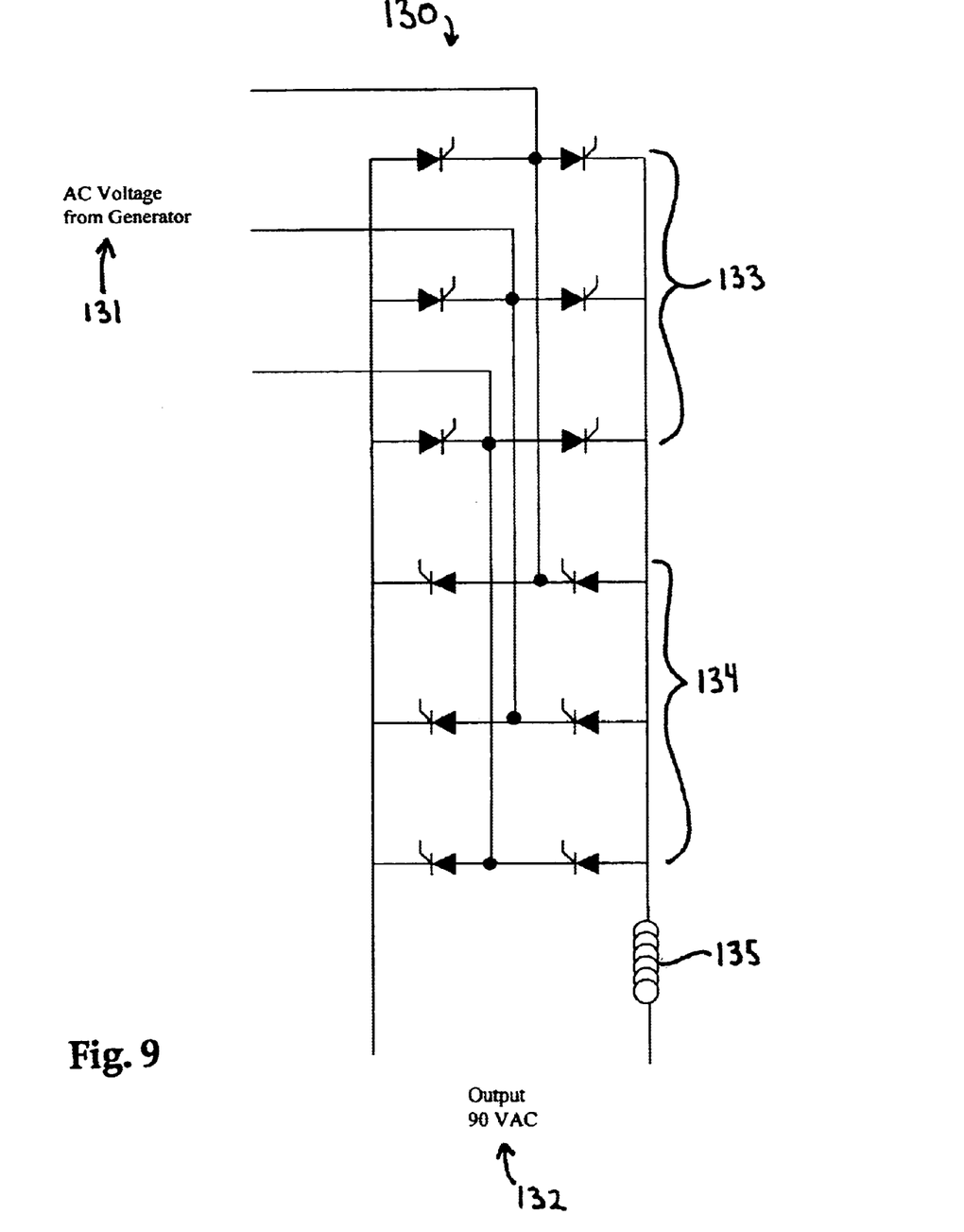
FIG. 9 is a schematic drawing of an output regulator for providing an alternating current output voltage in accordance with the invention.

When the flywheel uninterruptible power supply is used for supplying AC power to the output load, an expanded configuration of the output regulator is required. An output regulator for providing an alternating current output voltage in accordance with the invention is shown in FIG. 9. The output regulator 130 converts AC generator voltage 131 and converts it to a constant frequency and constant voltage alternating current output 132. To convert the AC into another lower voltage and lower frequency AC voltage, the regulator 130 is comprised to two 6 pulse controlled rectifiers 133, 134. One rectifier 133 is used for generating the positive portion of the output voltage waveform. The other rectifier 134 has the opposite polarity and is used to generate the negative portion of the output voltage waveform. An inductor 135 is used to smooth the output current and other filtering techniques known in the art could also be employed. As shown, the output regulator converts three phase AC into single phase AC, The output converter could also be made to supply three phase output power by tripling the number of negative and positive generating 6 pulse controlled rectifiers.

Figure 10:
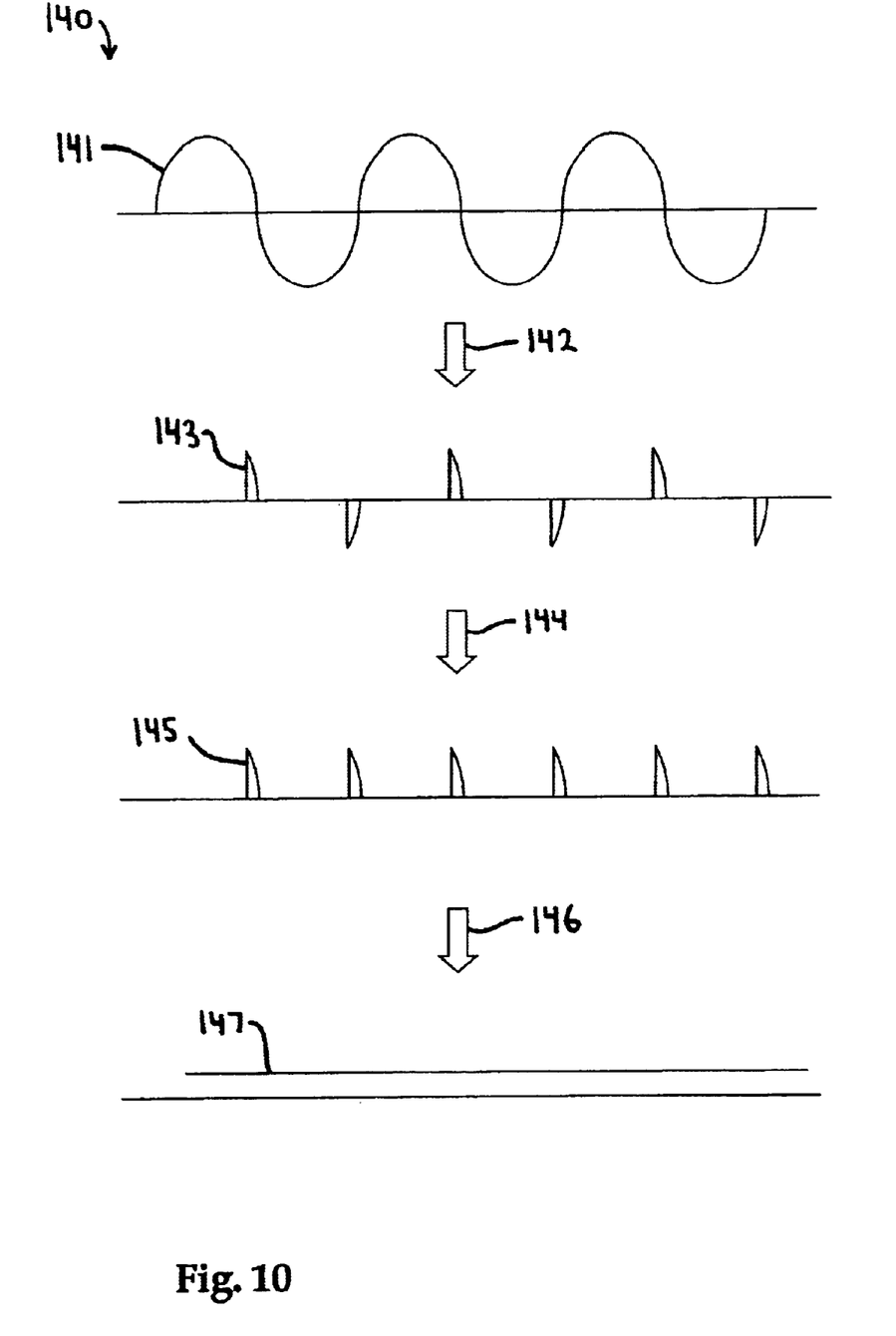
FIG. 10 is a process flow schematic of power conversion of the generator voltage showing a single phase with phase angle firing in accordance with the invention.

The firing of the triacs or thyristors of the output regulator can be conducted several ways. One way to regulate the output power is to use phase angle firing. The process of power conversion of the generator voltage with phase angle firing in accordance with the invention is shown for a single phase in FIG. 10. The process 140 takes the alternating current 141 from the generator and switches the power, as indicated at 142, at a delayed phase angle. The phase angle delay is controlled so that more or less of the generator sine wave power is switched to the load. A smaller delay angle results in more of the sine wave power being conducted to the output. The combination of the phase angle pieces 143 can include portions from both the positive half cycle and the negative half cycles. These half portions are rectified at 144 so that they all become positive portions 145. The portions or pulses of power are then smoothed and filtered at 146 to yield a substantially constant output voltage 147.

Figure 11:
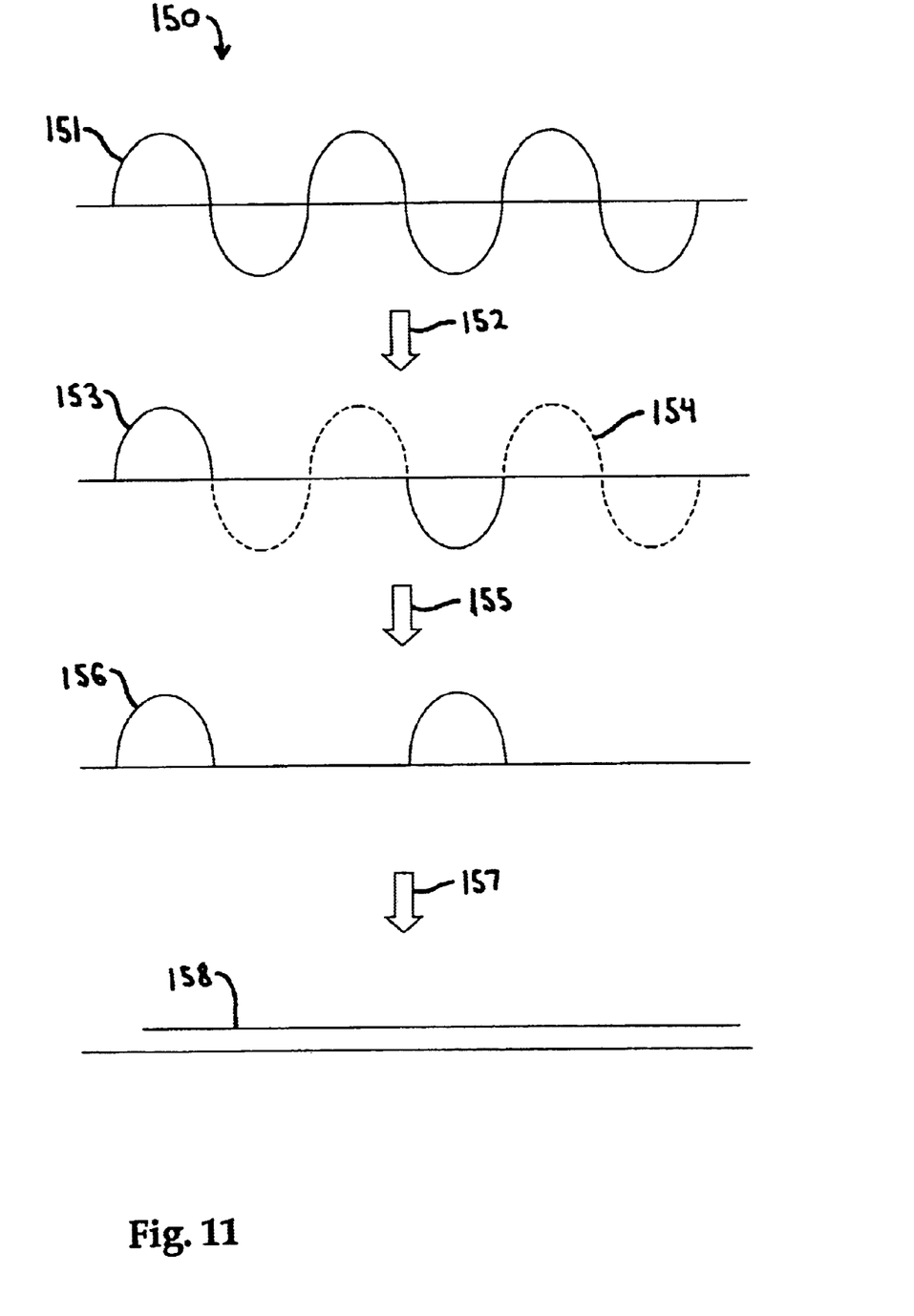
FIG. 11 is a process flow schematic of power conversion of the generator voltage showing a single phase with zero voltage switching in accordance with the invention.

Phase angle firing can achieve a smooth output with less filtering, however the thyristors must turn on at a non-zero voltage and hence have some losses. Phase angle firing can also cause generation electromagnetic interference and some harmonic distortion in the generator. An alternate switching method that can be used is zero crossover voltage firing. A process of power conversion of the generator voltage showing with zero voltage switching in accordance with the invention is shown for a single phase in FIG. 11. Zero crossover voltage firing 150 takes the input generator alternating current 151 and switches 152 it to the output in half or full sine wave portions. The half sine wave portions 153 are the result of the switching on of the thyristors only occurring when the generator voltage passes through zero. The switching loss is even further reduced along with harmonic distortion reflected back into the generator. This may have the benefit of reducing hysteresis and eddy current losses in the motor/generator. To regulate the power, not every half wave 154 is switched to the load. Therefore, when the pulses 153 are rectified and combined 155, the result is a less uniform voltage waveform with spaced apart half sine wave portions 156. The portions are filtered 157 to provide a sufficiently smooth output voltage 158. The output requires a larger filter than with phase angle firing, however efficiency should be increased with lower switching losses.

Figure 12:
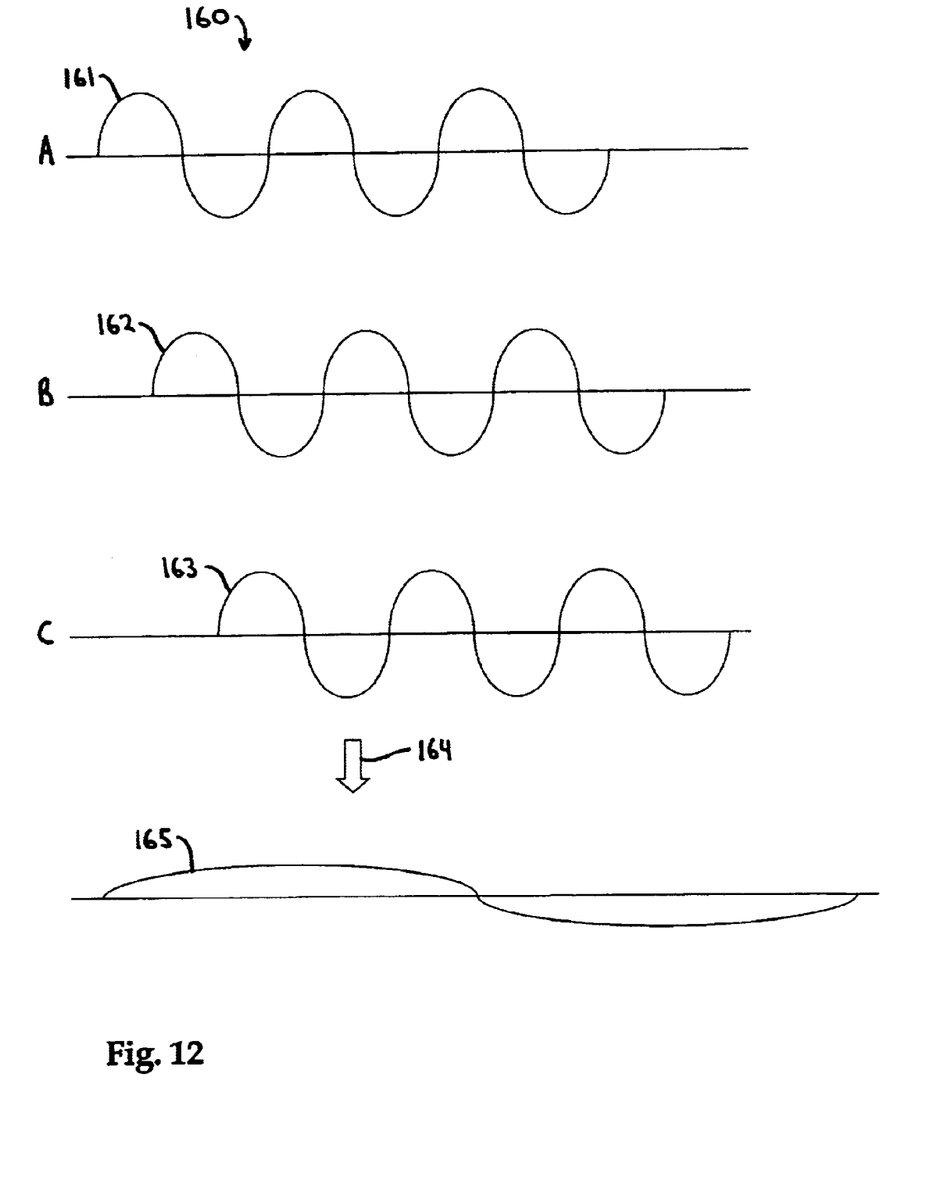
FIG. 12 is a process flow schematic of power conversion of the generator voltage showing three phases and conversion to a lower frequency alternating current output.

When the output is alternating current power, the generator AC power is converted to the output AC. The process of power conversion of the generator voltage to a lower frequency alternating current output is shown in FIG. 12. As shown the process 160 converts three phases of AC 161, 162, 163 from the generator in to a single phase alternating current output 165. The conversion could alternatively be done with more or less generator phases and or more output phases. The conversion 164 could use phase angle firing or zero cross firing however, phase angle firing is probably more likely to produce a cleaner output waveform with lower generator frequency due to the summation of smaller wave portions. The frequency of the output voltage 165 is preferably at least three times lower than the generator AC at the lowest flywheel discharge speed so that the output power can have an acceptable waveform with low harmonic content. Because the flywheel frequency and voltage are directly proportional, having a discharge speed ratio of greater than 3 to 1 would also be advantageous to extract most of the energy from the flywheel.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims.

Wherein I claim:

1. A flywheel uninterruptible power supply, comprising:
an energy storage flywheel supported for rotation on a bearing system;
a brushless motor/generator for accelerating and decelerating said flywheel for storing and retrieving energy;
said flywheel is rotated in normal operation at a speed such that generator voltage is higher than the output voltage;
said power supplied to the load from the generator is a regulated output that is maintained at a substantially constant voltage level by using switching regulation of the alternating current voltage generated by the generator;
said switching regulation per generator phase occurs at a frequency equal to or less than twice the frequency of the generator alternating current;
whereby said flywheel uninterruptible power supply efficiently maintains power to an electrical load during an interruption of primary power by supplying power generated from said flywheel generator.

2. A flywheel uninterruptible power supply as described in claim 1; wherein:
said switching regulation is accomplished with switching devices which switch on to off at substantially zero voltage.

3. A flywheel uninterruptible power supply as described in claim 1, wherein:
said switching regulation from on to off occurs at substantially zero current.

4. A flywheel uninterruptible power supply as described in claim 1, wherein:
said switching regulation uses phase angle switching.

5. A flywheel uninterruptible power supply as described in claim 1, wherein:
said switching regulation uses zero crossover firing.

6. A flywheel uninterruptible power supply as described in claim 1, wherein:
said switching regulation is done using thryistors.

7. A flywheel uninterruptible power supply as described in claim 1 wherein:
said switching regulation is done using triacs.

8. A flywheel uninterruptible power supply as described in claim 1, wherein:
said regulated output is a direct current voltage.

9. A flywheel uninterruptible power supply as described in claim 1, wherein:
said regulated output is an alternating current voltage.

10. A flywheel uninterruptible power supply as described in claim 9, wherein:
said generator frequency, at the lowest speed that the flywheel provides output power, is greater than twice the frequency of the alternating current output.

11. A power system as described in claim 1 wherein the generator voltage at normal operating speed is more twice the voltage supplied to the output load.

12. A power system as described in claim 1 wherein the motor/generator is a permanent magnet synchronous machine.

13. A power system as described in claim 1 wherein:
said motor/generator is comprised of a separate motor and generator.

14. A power system for energizing a flywheel motor of a flywheel uninterruptible power supply, comprising:
a control system powered from a DC-DC converter that has an operating input voltage range greater than 4 to 1 and is connected to a direct current side of an inverter that provides alternating current power to accelerate said flywheel motor.

15. A power system as described in claim 14 wherein the control system includes circuits for magnetic bearing support of the flywheel.

16. A power system as described in claim 15 wherein the inverter for accelerating the motor is sensorless.

17. A power system for a flywheel uninterruptible power supply comprised of an energy storage flywheel supported for rotation on a bearing system and accelerated and decelerated using a brushless motor/generator for storing and retrieving energy,
said flywheel uninterruptible power supply prevents interruption of power to an electrical load during an interruption of primary power by supplying power generated from the flywheel generator,
said power supplied to the load is maintained at a substantially constant voltage level by using switching at a frequency less than 2 kilohertz.

18. A power system as described in claim 17 wherein the switching converts alternating current from the generator to the power for the load.

19. A power system as described in claim 17 wherein the flywheel is constructed mostly of steel.

20. A power system as described in claim 19 wherein the flywheel is supported for rotation using passive radial magnetic bearings.

21. A power system as described in claim 20 wherein said power supplied to the load from the generator is maintained at a substantially constant voltage level by using switching regulation of the alternating current voltage generated by the generator,
said switching regulation per generator phase occurs at a frequency equal to or less than twice the frequency of the generator alternating current.

22. A power system for a flywheel uninterruptible power supply comprised of an energy storage flywheel supported for rotation on a bearing system and accelerated and decelerated using a brushless motor/generator for storing and retrieving energy,
said flywheel uninterruptible power supply prevents interruption of power to an electrical load during an interruption of primary power by supplying power generated from the flywheel generator,
said flywheel is rotated in normal operation at a speed such that generator voltage is higher than the output voltage,
said power supplied to the load from the generator is maintained at a substantially constant voltage level whether alternating or direct current by using an output converter that is connected to a DC bus that receives power either directly or indirectly from both the primary source and the flywheel source; and
said output converter has an operating input voltage range greater than 3 to 1.

23. A power system as described in claim 22 wherein the flywheel that stores energy is constructed mostly of steel.

24. A power system as described in claim 23 wherein the flywheel is supported for rotation using passive radial magnetic bearings.

25. A power system for a flywheel uninterruptible power supply comprised of an energy storage flywheel supported for rotation on a bearing system and accelerated and decelerated using a brushless motor/generator for storing and retrieving energy,
said flywheel uninterruptible power supply prevents interruption of power to an electrical load during an interruption of primary power by supplying power generated from the flywheel generator,
said power supplied to the load from the generator is maintained at a substantially constant voltage level by using switching regulation of the alternating current voltage generated by the generator,
said switching regulation converts the alternating current voltage from the generator directly into a lower frequency alternating current output voltage without intermediately converting the power to direct current.

26. A power system as described in claim 25 wherein the generator has a field coil to which a voltage is applied and increased as the flywheel speed decreases during a discharge.

27. A power system for a flywheel uninterruptible power supply that supplies protected alternating current power to a load upon failure of a primary power source, comprising:

an energy storage flywheel supported for rotation on a bearing system and accelerated and decelerated using a motor/generator for storing energy and for and retrieving energy as variable frequency generator power;

a transformer through which said power from said primary power source is supplied to the load during operation of said primary power source;

a transfer switch for switching between said flywheel motor/generator and said transformer; and an output regulator for converting said variable frequency generator power to an output alternating current power at a required voltage and frequency;

said power supplied to the load during a loss of power from said primary power source is supplied by conversion of energy stored in said flywheel to power for said load.

28. A power system as described in claim 27, wherein:

said output regulator synchronizes said output alternating current power with said utility supplied power when said transfer switch switches.

* * * * *